United States Patent
Tse

(10) Patent No.: US 10,033,531 B2
(45) Date of Patent: Jul. 24, 2018

(54) METHOD OF WIRELESS FIDELITY SECURE AUTHENTICATION

(75) Inventor: Francis K Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1001 days.

(21) Appl. No.: 13/425,880

(22) Filed: Mar. 21, 2012

(65) Prior Publication Data

US 2013/0250324 A1 Sep. 26, 2013

(51) Int. Cl.
| | |
|---|---|
| *H04Q 5/22* | (2006.01) |
| *H04W 12/08* | (2009.01) |
| *G06F 3/12* | (2006.01) |
| *H04L 9/32* | (2006.01) |
| *H04W 12/06* | (2009.01) |

(52) U.S. Cl.
CPC .......... *H04L 9/3226* (2013.01); *H04W 12/06* (2013.01); *H04L 2209/80* (2013.01)

(58) Field of Classification Search
CPC ..................................................... H04L 9/3226
USPC ......................................................... 358/1.13
See application file for complete search history.

(56) References Cited

U.S. PATENT DOCUMENTS

| | | | | |
|---|---|---|---|---|
| 7,505,434 B1 * | 3/2009 | Backes | ............... | H04L 63/0272 370/331 |
| 7,628,329 B2 * | 12/2009 | Tanaka et al. | ................. | 235/460 |
| 8,823,494 B1 * | 9/2014 | Kovitz | ................. | H01Q 1/2225 340/10.1 |
| 2005/0245235 A1 * | 11/2005 | Vesuna | ................... | H04L 63/08 455/411 |
| 2007/0241194 A1 * | 10/2007 | Lin et al. | ................. | 235/462.01 |
| 2008/0215872 A1 * | 9/2008 | Choi | ..................... | G06F 21/575 713/2 |
| 2008/0220741 A1 * | 9/2008 | Hung | ............................ | 455/411 |
| 2009/0125537 A1 * | 5/2009 | Susi | .................... | G06F 17/2217 |
| 2009/0324025 A1 * | 12/2009 | Camp et al. | .................. | 382/124 |
| 2010/0333186 A1 * | 12/2010 | Chan et al. | ..................... | 726/10 |
| 2012/0008161 A1 * | 1/2012 | Rouhana | ................. | H04W 4/00 358/1.15 |

OTHER PUBLICATIONS

WFA Device 1.0, Template Version 1.01, Jan. 2006, pp. 1-8.
WFA WLANConfig Service 1.0, Service Template Version 1.01, Jan. 2006, pp. 1-22.
Wi-Fi Alliance Technical Committee P2P Task Group, Technical Specification, Version 1.1, pp. 1-24, Jan. 2006.
Wi-Fi Protected Setup Specification, Version 1.0h, Dec. 2006, pp. 1-14.

\* cited by examiner

*Primary Examiner* — Neil R McLean
*Assistant Examiner* — Darryl V Dottin
(74) *Attorney, Agent, or Firm* — Fox Rothschild LLP

(57) ABSTRACT

A method for setting up a secure connection between a mobile communication device and a wireless access point is disclosed. The method comprises generating a machine-readable code corresponding to the wireless access point. The generated machine-readable code is scanned through an image-capturing unit. Further, the scanned machine-readable code is converted into a unique identification number that corresponds to the wireless access point. The unique identification number is transmitted to the wireless access point. The mobile communication device is authenticated based on the transmitted unique identification number by sending an authentication message to the mobile communication device.

22 Claims, 4 Drawing Sheets

METHOD OF WIRELESS FIDELITY SECURE AUTHENTICATION

TECHNICAL FIELD

The presently disclosed embodiments are directed to Wireless Fidelity technology. More specifically the presently disclosed embodiments are directed to a method and a system for establishing a secure connection between devices using Wireless Fidelity technology.

BACKGROUND

In the recent past, wireless technology has seen an increased number of security threats such as brute-force attacks. Therefore, authentication and strong encryption are used to counterattack the security threats. Current authentication and encryption methods involve a Personal Identification Number (PIN) entry and a Push-button entry. The method involving the Push-button entry requires actions to be completed between devices connected through the wireless technology within a time window of two minutes. The method involving the PIN entry is prone to mistypes.

SUMMARY

According to aspects illustrated herein, a method is provided for setting up a secure connection between a mobile communication device and a wireless access point are disclosed. In an embodiment, the method includes generating a machine-readable code corresponding to the wireless access point. The method further includes scanning the generated machine-readable code through an image-capturing unit of the mobile communication device. Further, the scanned machine-readable code is converted into a unique identification number corresponding to the wireless access point. The unique identification number is transmitted to the wireless access point. The method also includes authenticating the mobile communication device, based on the transmitted unique identification number, by sending an authentication message to the mobile communication device.

BRIEF DESCRIPTION OF DRAWINGS

The following detailed descriptions of the embodiments of the disclosure will be better understood when read with reference to the appended drawings. The disclosure is illustrated by way of example, and is not limited by the accompanying figures, in which like references indicate similar elements.

DETAILED DESCRIPTION

Various terms that appear in the following description have been defined below:

Wireless access point: A wireless access point corresponds to a device capable of connecting wireless devices such as, laptops, mobile communication devices, tablet computers or the like to a wired or wireless network using Bluetooth®, Wi-Fi™ or the like.

Unique Identification Number: A Unique Identification Number corresponds to a unique number associated with a device such as, but is not limited to, a printer, a multifunction device, a scanner and an access point. The Unique Identification Number is used to authenticate and establish secure connections between devices connected through wireless technology. Example of the Unique Identification Number includes, but is not limited to, a Personal Identification Number (PIN).

Machine-readable code: A machine-readable code corresponds to an electronic code that can be read by an electronic machine. Examples of the machine-readable code include, but are not limited to, a one dimension barcode, such as a Universal Product Code (UPC), or a two dimensional bar code, such as a Quick Response (QR) code, a High Capacity Color Barcode or a MaxiCode.

Multifunction image-forming device: A multifunction image-forming device corresponds to a device that can perform multiple functions. Examples of the functions include, but are not limited to, printing, scanning, copying, faxing, emailing, and the like. The multifunction image-forming device can include functionalities of a wireless access point.

The disclosure can be best understood with reference to the detailed figures and description set forth herein. Various embodiments are discussed below with reference to the figures. However, those skilled in the art will readily appreciate that the detailed description given herein with respect to the figures is just for explanatory purposes as the method and the system extend beyond the described embodiments. For example, those skilled in the art will appreciate that, in light of the teachings presented, multiple alternate and suitable approaches can be realized, depending on the needs of a particular application, to implement the functionality of any detail described herein.

Figure 1:
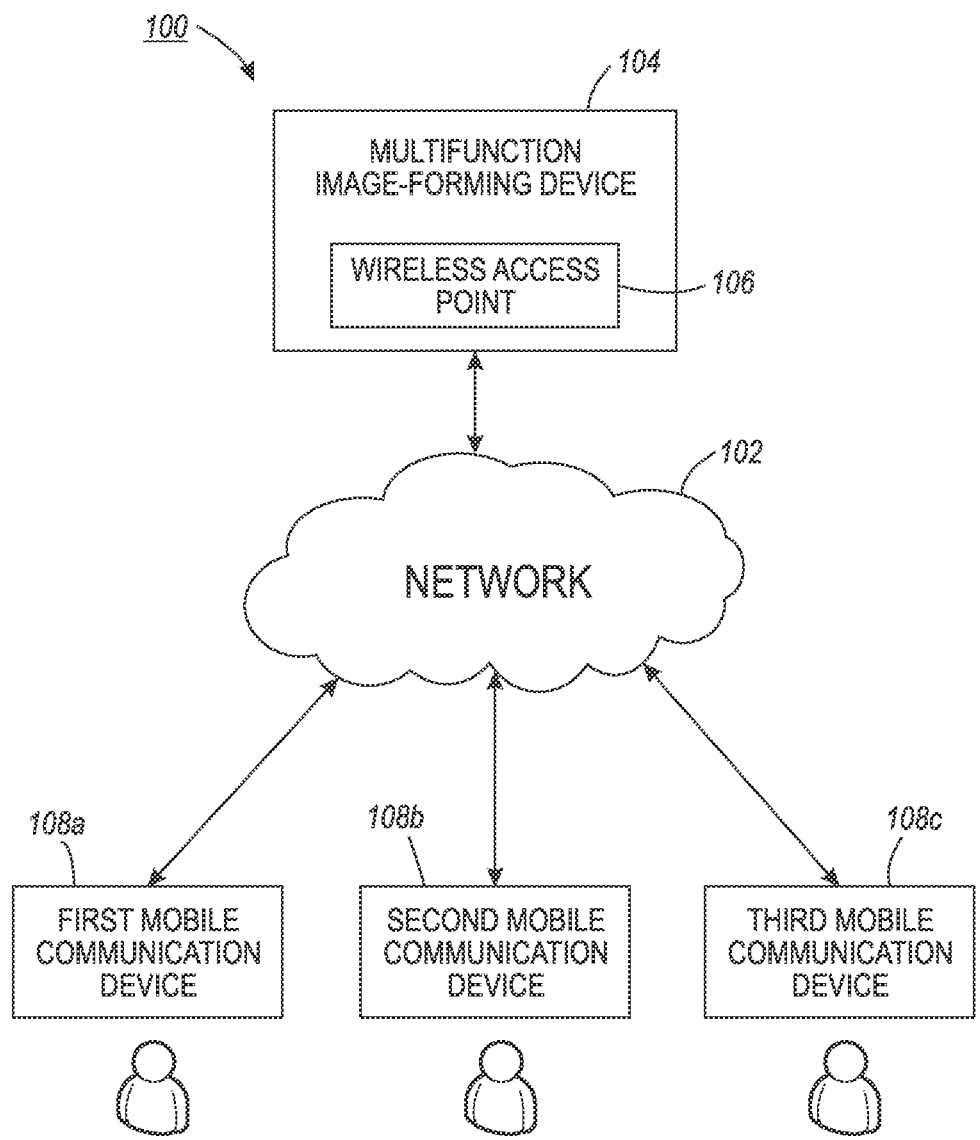
FIG. 1 illustrates a system environment in which the disclosed embodiments can be implemented.

FIG. 1 illustrates a system environment 100 in which the disclosed embodiments can be implemented. The system environment 100 includes a network 102, a multifunction image-forming device 104, a wireless access point 106 and a plurality of mobile communication devices 108a, 108b and 108c, hereinafter referred to as 'mobile communication device 108'. The multifunction image-forming device 104, the wireless access point 106 and the mobile communication device 108 communicate through the network 102.

The network 102 corresponds to a medium through which content and messages flow between the various components (e.g. the mobile communication device 108 and the multifunction image-forming device 104) of the system environment 100. Examples of the network 102 may include, but are not limited to, a Wireless Fidelity (Wi-Fi) network, a Wireless Universal Serial Bus (WUSB) or Bluetooth. Various devices in the system environment 100 can connect to the network 102 in accordance with various wireless communication protocols such as Transmission Control Protocol and Internet Protocol (TCP/IP), User Datagram Protocol (UDP) and IEEE 802.11n communication protocols.

In an embodiment, the multifunction image-forming device 104 is shown to include the wireless access point 106. Further, the multifunction image-forming device 104 is enabled with wireless connectivity.

The multifunction image-forming device 104 further includes a user interface having a display screen associated with it. The display screen is configured to display a machine-readable code corresponding to a unique identification number associated with the multifunction image-forming device 104. In an embodiment, a printed copy of the machine-readable code is physically attached to the multifunction image-forming device 104 for ease of access.

The mobile communication device 108 may corresponds to electronic device, such as, but is not limited to, a Personal Digital Assistant (PDA), a Smartphone, a tablet PC, a laptop, a mobile phone, a Digital Living Network Alliance (DLNA) enabled device, etc. The mobile communication device 108 has an image-capturing unit associated with it. The image-capturing unit may have a lens that scans an image. Further, the image-capturing unit may also include a built-in image positioner, distance finder, and flash bulb. An example of the image-capturing unit may include, but is not limited to, a digital camera. Further, the mobile communication device 108 includes an application that instructs the image-capturing unit to scan the machine-readable code. The application further converts the scanned machine-readable code into a unique identification number. Examples of the application may include, but are not limited to, a QR code scanning application, and a bar code scanning application. In an embodiment, the mobile communication device 108 transmits the unique identification number to the multifunction image-forming device 104. In another embodiment, the mobile communication device 108 receives an authentication message from the multifunction image-forming device 104.

Further, those skilled in the art may appreciate that the disclosed embodiments can be extended to a plurality of mobile communication devices although only three mobile communication devices have been shown for the sake of simplicity.

Figure 2A:
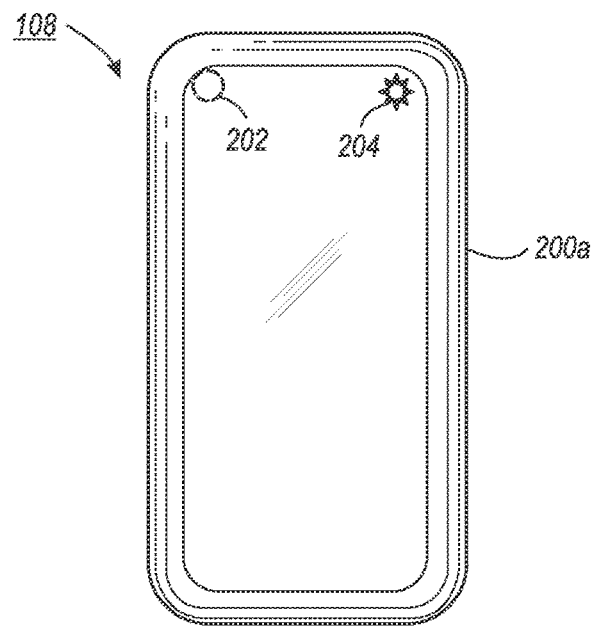
FIG. 2a illustrates a rear view of a mobile communication device in accordance with an embodiment.

FIG. 2a illustrates a rear view 200a of the mobile communication device 108 in accordance with an embodiment. The rear view 200a of the mobile communication device 108 is shown to include an image-capturing unit 202, and a flash bulb 204. The image-capturing unit 202 in association with the flash bulb 204 helps in effective scanning of an image.

Figure 2B:
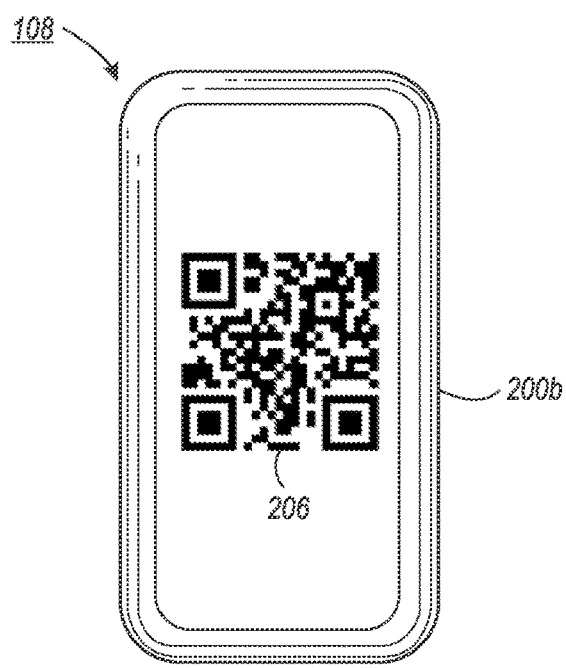
FIG. 2b illustrates a front view of a mobile communication device in accordance with an embodiment.

FIG. 2b illustrates a front view 200b of the mobile communication device 108 in accordance with an embodiment. FIG. 2b is explained in conjunction with FIG. 2a. The front view 200b of the mobile communication device 108 is shown to display a machine-readable code 206. In an embodiment, the image-capturing unit 202 effectively scans the machine-readable code 206. In an embodiment, the scanning of the machine-readable code 206 by the image-capturing unit 202 is controlled by an application installed in the mobile communication device 108.

It is known to a person skilled in the art that the embodiments shown in FIG. 2a and FIG. 2b (the rear view 200a and the front view 200b) of the mobile communication device 108 are just for explanatory purposes and there could be many more such embodiments that could be applicable.

Figure 3:
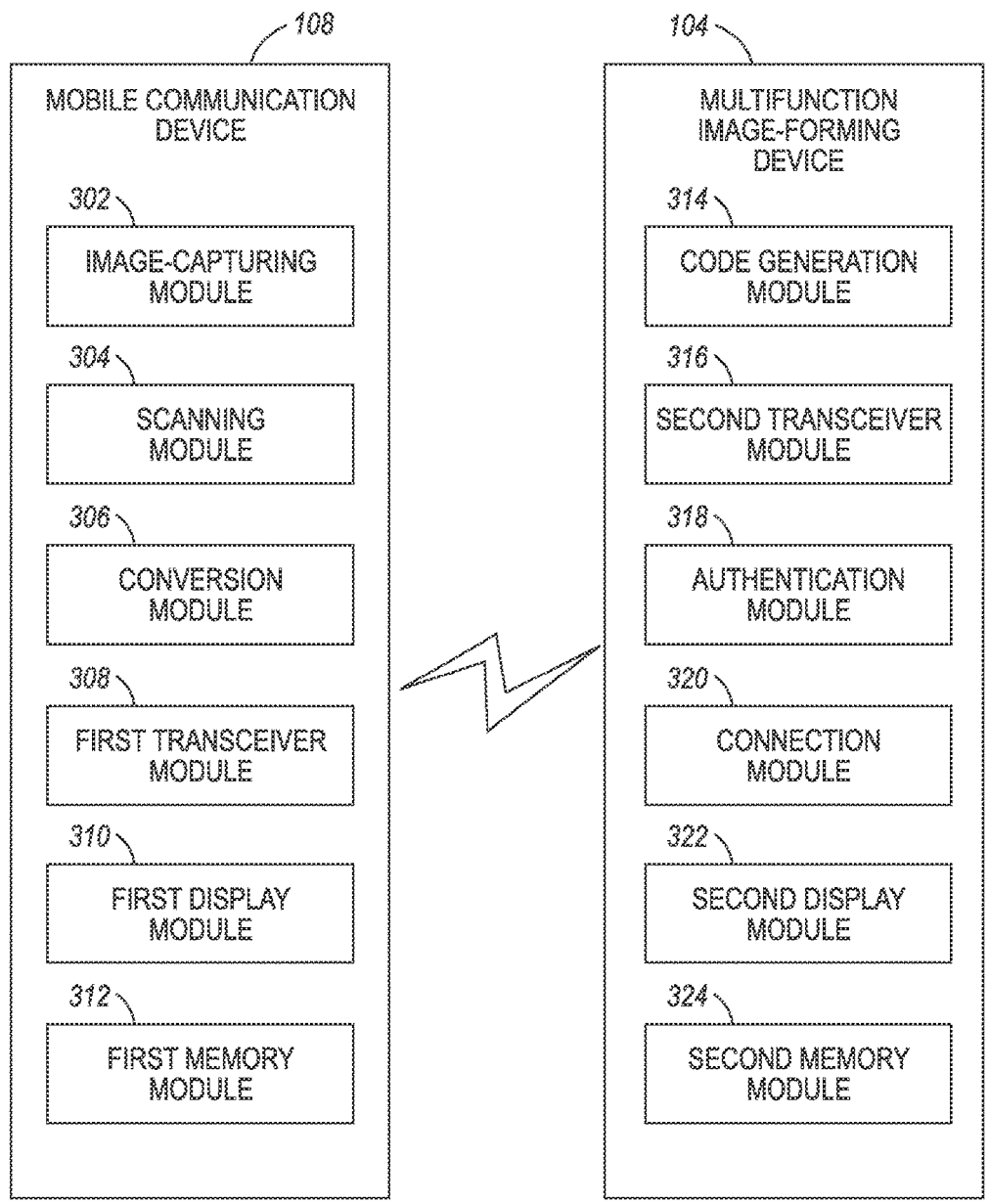
FIG. 3 illustrates a system diagram that includes various modules associated with the mobile communication device and the multifunction image-forming device, in accordance with an embodiment of the disclosure.

FIG. 3 illustrates a system diagram 300 that includes various modules associated with the mobile communication device 108 and the multifunction image-forming device 104, in accordance with an embodiment of the disclosure. Further, FIG. 3 is explained in conjunction with FIG. 1, FIG. 2a and FIG. 2b. The system diagram 300 is shown to include the mobile communication device 108 and the multifunction image-forming device 104. The mobile communication device 108 includes an image-capturing module 302, a scanning module 304, a conversion module 306, a first transceiver module 308, a first display module 310, and a first memory module 312. The multifunction image-forming device 104 includes a code generation module 314, a second transceiver module 316, an authentication module 318, a connection module 320, a second display module 322, and a second memory module 324.

The image-capturing module 302 is configured to control the operation of the image-capturing unit 202. The image-capturing module 302 is further configured to control the built-in image positioner for positioning the lens in order to scan the image. Further, the image-capturing module 302 controls the distance finder of the image-capturing unit 202 to determine a distance between the image and the lens of the image-capturing unit 202. The determined distance helps in scanning the image that is sharp in focus. The image-capturing module 302 is further configured to control an operation of the flash bulb 204. In an embodiment, the image-capturing module 302 controls an on-off functionality of the flash bulb 204. In another embodiment, the image-capturing module 302 controls intensity of light coming out of the flash bulb 204.

The scanning module 304 of the mobile communication device 108 is configured to scan the machine-readable code 206. In an embodiment, the scanning module 304 in association with the image-capturing unit 202 scans the machine-readable code 206. In an embodiment, the scanning of the machine-readable code 206 is controlled by the application installed in the mobile communication device 108. Further, the scanning module 304 stores data pertaining to the scanned machine-readable code 206 at the first memory module 312.

The conversion module 306 of the mobile communication device 108 is configured to retrieve the data pertaining to the scanned machine-readable code 206 from the first memory module 312. Further, the conversion module 306 converts the scanned machine-readable code 206 into a unique identification number corresponding to the multifunction image-forming device 104. In an embodiment, the conversion is performed by the application installed in the mobile communication device 108. In an embodiment, the conversion module 306 stores data pertaining to the unique identification number at the first memory module 312.

In an embodiment, the first transceiver module 308 is configured to retrieve the data pertaining to the unique identification number from the first memory module 312. Further, the first transceiver module 308 is configured to establish an unsecured connection with the multifunction image-forming device 104. The first transceiver module 308 transmits the unique identification number to the multifunction image-forming device 104. In an embodiment, the first transceiver module 308 can be triggered to transmit the unique identification number when the unique identification number is generated by converting the scanned machine-readable code 206 into the unique identification number. In another embodiment, the first transceiver module 308 is configured to receive an authentication message sent from the multifunction image-forming device 104. In an embodiment, unsecured connection enables the first transceiver module 308 to transmit the unique identification number and receive an authentication message from the multifunction image-forming device 104.

In another embodiment, the first transceiver module 308 establishes a secure connection with the multifunction image-forming device 104 subsequent to a successful authentication. The secure connection enables the first transceiver module 308 to transmit data associated with one or more of the multiple functionalities of the multifunction image-forming device 104.

The first display module 310 is configured to display the scanned machine-readable code 206 on a display screen. In an embodiment, the display screen associated with the mobile communication device 108 performs the functionality of a user interface.

In an embodiment, the mobile communication device 108 can include an audio device integrated with the display screen. The first display module 310 is configured to provide an audio message via the audio device, confirming the receipt of the authentication message. In an embodiment, the first display module 310 can be configured to provide a combination of visual and the audio message to confirm the receipt of the authentication message.

The code generation module 314 of the multifunction image-forming device 104 is configured to generate the machine-readable code 206 associated with the multifunction image-forming device 104. In an embodiment, the code generation module 314 randomly generates one or more machine-readable codes (such as the machine-readable code 206) that uniquely associate with the multifunction image-forming device 104. The random generation of the one or more machine-readable codes enhances secure communication between the multifunction image-forming device 104 and the mobile communication device 108. Further, the code generation module 314 stores the generated one or more machine-readable codes at the second memory module 324.

The second transceiver module 316 of the multifunction image-forming device 104 is configured to receive the unique identification number transmitted by the first transceiver module 308 of the mobile communication device 108. Further, the received unique identification number is stored at the second memory module 324. In an embodiment, the received unique identification number corresponds to the machine-readable code 206 scanned by the scanning module 304 of the mobile communication device 108. Further, the second transceiver module 316 sends the authentication message to the mobile communication device 108 based on an authenticity of the received unique identification number.

The authentication module 318 of the multifunction image-forming device 104 is configured to authenticate the unique identification number received by the second transceiver module 316 of the multifunction image-forming device 104. The authentication module 318 retrieves the unique identification number stored at the second memory module 324. Further, the authentication module 318 determines the authenticity of the unique identification number received by the multifunction image-forming device 104. The authenticity is determined by way of comparing the unique identification number received by the multifunction image-forming device 104 with a unique identification number corresponding to the multifunction image-forming device 104. In an embodiment, the authentication module 318 stores data pertaining to the authenticity of the unique identification number received by the second transceiver module 316 at the second memory module 324.

In an embodiment, the connection module 320 of the multifunction image-forming device 104 is configured to establish a secure connection between the mobile communication device 108 and the wireless access point 106 of the multifunction image-forming device 104.

In an embodiment, the connection module 320 retrieves the data pertaining to the authenticity of the unique identification number received by the second transceiver module 316. Further, the connection module 320 establishes the secure connection between the mobile communication device 108 and the wireless access point 106 based on the retrieved data pertaining to the authenticity of the unique identification number.

The second display module 322 of the multifunction image-forming device 104 is configured to display the one or more machine-readable codes associated with the unique identification number of the multifunction image-forming device 104. In an embodiment, the multifunction image-forming device 104 displays the machine-readable code 206 associated with the unique identification number of the multifunction image-forming device 104. The second display module 322 retrieves the machine-readable codes 206 from the second memory module 324 and displays the machine-readable code 206 on a display screen associated with the multifunction image-forming device 104. In another embodiment, the second display module 322 displays the authentication message on the display screen associated with the multifunction image-forming device 104 based on the authenticity of the unique identification number received by the multifunction image-forming device 104.

In an embodiment, the second memory module 324 of the multifunction image-forming device 104 is configured to store the one or more machine-readable codes generated by the code generation module 314. In another embodiment, the second memory module 324 stores the data pertaining to the authenticity of the unique identification number received by the second transceiver module 316.

Figure 4:
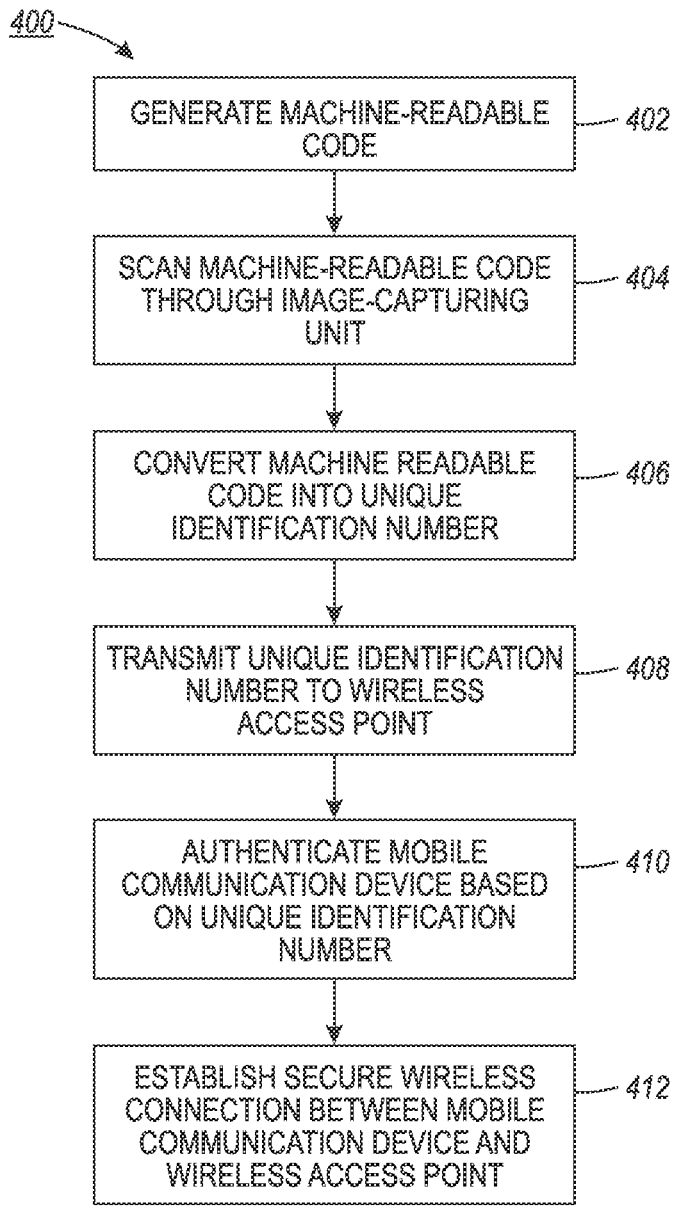
FIG. 4 illustrates a method for setting up a secure connection between a mobile communication device and a wireless access point, in accordance with an embodiment of the disclosure.

FIG. 4 illustrates a method for setting up a secure connection between a mobile communication device 108 and a wireless access point 106, in accordance with an embodiment of the disclosure. Further, FIG. 4 is explained in conjunction with FIG. 1, FIG. 2a, FIG. 2b and FIG. 3.

At step 402, the machine-readable code 206 is generated. The code generation module 314 of the multifunction image-forming device 104 generates the machine-readable code 206 corresponding to the multifunction image-forming device 104.

In an embodiment, the machine-readable code 206 generated by the multifunction image-forming device 104 is random. The code generation module 314 randomly generates the one or more machine-readable codes corresponding to the multifunction image-forming device 104. In an embodiment, the one or more machine-readable codes correspond to the unique identification number of the multifunction image-forming device 104. The one or more machine-readable codes generated by the code generation module 314 are stored in the second memory module 324. The one or more machine-readable codes stored in the second memory module 324 are displayed on the display screen associated with the multifunction image-forming device 104.

In an embodiment, the machine-readable code 206 generated by the multifunction image-forming device 104 is physically printed out and attached to the multifunction image-forming device 104.

At step 404, the machine-readable code 206 is scanned through the image-capturing unit 202. In an embodiment, the image-capturing unit 202 scans the machine-readable code 206 physically attached to the multifunction image-forming device 104. In another embodiment, the image-capturing unit 202 scans the one or more machine-readable codes displayed on the display screen.

In an embodiment, the scanning of the machine-readable code 206 is controlled by the application installed in the mobile communication device 108. The scanning module 304 scans the machine-readable code 206 using the image-capturing unit 202 controlled by the image-capturing module 302. Further, the scanned image is stored at the first memory module 312.

At step 406, the machine-readable code 206 is converted into the unique identification number. The application installed in the mobile communication device 108 converts the machine-readable code 206 into the unique identification number associated with the multifunction image-forming device 104.

In an embodiment, the conversion module 306 of the mobile communication device 108 retrieves the data pertaining to the scanned machine-readable code 206 from the first memory module 312 and converts it into the unique identification number using the application installed in the mobile communication device 108. Further, the unique identification number is stored at the first memory module 312.

At step 408, the unique identification number is transmitted to the multifunction image-forming device 104. In an embodiment, the first transceiver module 308 retrieves the unique identification number from the first memory module 312. Further, the first transceiver module 308 transmits the unique identification number to the multifunction image-forming device 104.

At step 410, the mobile communication device 108 is authenticated based on the unique identification number. In an embodiment, the second transceiver module 316 receives the unique identification number transmitted by the mobile communication device 108. The authentication module 318 authenticates the unique identification number. Further, the authentication module 318 stores data pertaining to the authenticity of the received unique identification number at the second memory module 324. Furthermore, the second transceiver module 316 sends the authentication message to the mobile communication device 108. The first display module 310 provides an audio message via the audio device, confirming the receipt of the authentication message. In an embodiment, the first display module 310 provides a combination of visual and audio message to confirm the receipt of the authentication message.

At step 412, a secure wireless connection is established between the mobile communication device 108 and the wireless access point 106 of the multifunction image-forming device 104. The connection module 320 retrieves the data pertaining to the authenticity of the received unique identification number. Further, the connection module 320 establishes a secure connection between the wireless access point 106 and the mobile communication device 108 based on the authenticity of the received unique identification number. Further, the second display module 322 displays the authentication message on the display screen. Therefore, the secure wireless connection is established between the mobile communication device 108 and the wireless access point 106 through the embodiments disclosed in the disclosure.

In an embodiment, the mobile communication device 108 can establish in a secure manner, a direct wireless connection with the multifunction image-forming device 104 having the wireless access point 106 build into it. In this case, the multifunction image-forming device 104 directly authenticates the mobile communication device 108.

In another embodiment, the mobile communication device 108 establishes a secure wireless connection with the multifunction image-forming device 104 via an intermediate access point having the capabilities of the wireless access point 106.

In an embodiment, the intermediate access point does not possess the capabilities of the multifunction image-forming device 104 such as, printing, displaying, photocopying, faxing, scanning or the like. Therefore, the intermediate access point could have a physical copy of the machine-readable code 206 attached to it such that the mobile communication device 108 can scan the machine-readable code 206. Further, the intermediate access point transmits the authentication message to the mobile communication device 108 based on the authenticity of the unique identification number.

In another embodiment, the intermediate access point has a display that displays the one or more machine-readable codes that are dynamically generated by the intermediate access point. In this case, the mobile communication device 108 is authentically connected to the intermediate access point.

The disclosed methods and systems, as described in the ongoing description or any of its components, may be embodied in the form of a computer system. Typical examples of a computer system include a general-purpose computer, a programmed microprocessor, a micro-controller, a peripheral integrated circuit element, and other devices or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as a floppy-disk drive, optical-disk drive, etc. The storage device may also be other similar means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information as desired. The storage element may be in the form of an information source or a physical memory element present in the processing machine.

The programmable or computer readable instructions may include various commands that instruct the processing machine to perform specific tasks such as the steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to 'C', 'C++', 'Visual C++' and 'Visual Basic'. Further, the software may be in the form of a collection of separate programs, a program module with a larger program or a portion of a program module, as in the disclosure. The software may also include modular programming in the form of object-oriented programming. The processing of input data by the processing machine may be in response to user commands, results of previous processing or a request made by another processing machine. The disclosure can also be implemented in all operating systems and platforms including, but not limited to, 'iOS', 'Unix', 'DOS', 'Android', 'Symbian', and 'Linux'.

The programmable instructions can be stored and transmitted on a computer-readable medium. The disclosure can also be embodied in a computer program product comprising a computer-readable medium, with the product capable of implementing the above methods and systems, or the numerous possible variations thereof.

It will be appreciated that variants of the above disclosed and other features and functions, or alternatives thereof, may be combined to create many other different systems or applications. Various unanticipated alternatives, modifications, variations, or improvements therein may be subsequently made by those skilled in the art and are also intended to be encompassed by the following claims.

The claims can encompass embodiments in hardware, software, or a combination thereof.

The word "printer" as used herein encompasses any apparatus, such as a digital copier, bookmaking machine, facsimile machine, multi-function machine, and the like, which performs a print outputting function for any purpose.

What is claimed is:

1. A method for setting up a secure connection between a mobile communication device and a multi-function image-forming device that includes a wireless access point, the method comprising:
   by a multi-function image-forming device, presenting a machine-readable code corresponding to a unique identifier associated with the multi-function image-forming device;
   by an image-capturing unit of the mobile communication device, scanning the machine-readable code as presented by the multi-function image-forming device;
   converting, by the mobile communication device, the scanned machine-readable code into a unique identification corresponding to the multi-function image-forming device;
   transmitting, by the mobile communication device, the unique identification to a wireless access point over an unsecured connection between the mobile communication device and the wireless access point;
   by the wireless access point, authenticating the mobile communication device for a secure wireless connection based on the transmitted unique identification;
   sending an authentication message to the mobile communication device from the wireless access point over the unsecured connection; and
   after authenticating the mobile communication device for the secure connection, establishing the secure wireless connection between the mobile communication device and the wireless access point.

2. The method of claim 1, wherein the scanning of the machine-readable code is enabled through an application installed on the mobile communication device.

3. The method of claim 2, wherein the scanned machine-readable code is converted into the unique identification using the application on the mobile communication device.

4. The method of claim 1, wherein a printed copy of the machine-readable code is generated when requested by a user to aid in the scanning of the machine-readable code.

5. The method of claim 1 further comprising comparing the unique identification with a second identification associated with the wireless access point, wherein the secure connection is established by the wireless access point with the mobile communication device based on the comparison.

6. A method for establishing a secure connection between a mobile communication device and a multi-function image-forming device, the method comprising:
   by a mobile communication device:
      scanning a machine-readable code as output by a multi-function image-forming device, wherein the machine readable code is generated by the multi-function image-forming device and the multi-function image-forming device includes a wireless access point;
      converting the scanned machine-readable code into a unique identification;
      transmitting the unique identification to the wireless access point over an unsecured connection between the mobile communication device and the wireless access point;
      receiving an authentication message from the wireless access point over the unsecured connection, wherein the authentication message is indicative of an authenticity of the machine-readable code; and
      using the authentication message to establish a secure wireless connection between the mobile communication device and the multi-function image-forming device.

7. A method for setting up a secure connection between a mobile communication device and a multi-function image-forming device, the method comprising:
   by a multi-function image-forming device that includes a wireless access point:
      generating a machine-readable code, wherein the machine-readable code corresponds to a unique identification associated with the multi-function image-forming device;
      outputting the machine-readable code on a display screen or a printed copy;
      by the wireless access point, receiving the unique identification from a mobile communication device that has scanned the machine-readable code; and
      authenticating the mobile communication device based on the unique identification;
      sending an authentication message to the mobile communication device and establishing a secure wireless connection between the mobile communication device and the multi-function image-forming device.

8. A multifunction image-forming device for connecting wirelessly to a mobile communication device, the multi-function image-forming device comprising:
   a computer system comprising a microprocessor, a microcontroller, or an integrated circuit element;
   a code generation module comprising computer program instructions that are stored in a storage device and that are configured to cause the computer system to generate a machine-readable code, wherein the generated machine readable code is utilizable to identify the multifunction image-forming device;
   a transceiver suitable for receiving a unique identification from the mobile communication device, over an unsecured connection, wherein the unique identification corresponds to the generated machine-readable code;
   an authentication module comprising computer program instructions that are stored in a storage device and that are configured to cause the computer system to authenticate the unique identification; and a connection module comprising a communication unit suitable for securely connecting the multifunction image-forming device with the mobile communication device based on a comparison of the unique identification number with an identification stored by the multifunction image-forming device and associated with the generated machine-readable code.

9. The multifunction image-forming device of claim 8 further comprising a display module that comprises a display screen and that is configured for displaying an authentication message based on the comparison.

10. The multifunction image-forming device of claim 8, further comprises a display screen configured to display the machine-readable code after the machine-readable code is generated by the multifunction image-forming device.

11. A mobile communication device for connecting wirelessly to a multifunction image-forming device, the mobile communication device comprising:

a computer system comprising a microprocessor, a microcontroller, or an integrated circuit element;

a scanning module that comprises an image-capturing unit with a lens and that is configured to scan a machine-readable code corresponding to a multifunction image-forming device through an image-capturing unit, wherein the machine-readable code is generated by the multifunction image-forming device and the multifunction image-forming device includes a wireless access point;

a conversion module comprising an application stored in a storage device and configured to cause the computer system to convert the machine-readable code into a unique identification number corresponding to the multifunction image-forming device;

a transceiver configured to transmit the unique identification number to the multifunction image-forming device over an unsecured connection and receive an authentication message from the multifunction image-forming device; and computer readable instructions stored on a storage element that are configured to cause the mobile communication device to establish a secure wireless connection with the multifunction image-forming device after receiving the authentication message.

12. The mobile communication device of claim 11 further comprising a display module that comprises a display screen and that is configured for displaying the scanned machine-readable code.

13. A non-transitory computer-readable storage medium having stored thereon, a computer program being executable by one or more processors to establish a secure connection between a mobile communication device and a wireless access point of a multi-function image-forming device, the non-transitory computer-readable storage medium comprising:

program instructions for scanning a machine-readable code through an image-capturing unit of a mobile communication device, wherein the machine-readable code is generated by a multi-function image-forming device that includes a wireless access point;

program instructions for converting the scanned machine-readable code into a unique identification;

program instructions for transmitting the unique identification from the mobile communication device to the wireless access point over an unsecured connection between the mobile communication device and the wireless access point;

program instructions for receiving an authentication message from the wireless access point over the unsecured connection, wherein the authentication message is indicative of an authenticity of the machine-readable code; and program instructions for establishing a secure wireless connection between the mobile communication device and the wireless access point of the multi-function image-forming device after receiving the authentication message.

14. The non-transitory computer readable storage medium of claim 13, wherein the instructions for scanning the machine-readable code comprise instructions that are part of an application installed on the mobile communication device.

15. The non-transitory computer readable storage medium of claim 14, wherein the instructions further comprise instructions to convert the scanned machine-readable code into the unique identification using the application on the mobile communication device.

16. A non-transitory computer-readable storage medium having stored thereon, a computer program being executable by one or more processors to establish a secure connection between a mobile communication device and a wireless access point of a multi-function image-forming device, the non-transitory computer-readable storage medium comprising:

program instructions for generating, by a multi-function image-forming device that includes a wireless access point, a machine-readable code, wherein the generated machine readable code is associated with a unique identifier that is utilizable to identify the wireless access point;

program instructions for presenting the machine-readable code to a mobile communication device;

program instructions for receiving a unique identification from the mobile communication device corresponding to the generated machine-readable code;

program instructions configured to authenticate the mobile communication device by comparing the unique identification received from the mobile communication device with the unique identifier; and program instructions means for establishing a secure connection between the multi-function image-forming device and the mobile communication device based on the comparison.

17. A non-transitory computer-readable storage medium of claim 16, wherein the program instructions for presenting the machine-readable code comprise program instructions to display the machine-readable code on a display screen of the multi-function image-forming device.

18. The method of claim 1, wherein the multi-function image-forming device comprises the wireless access point.

19. The method of claim 18, further comprising:

by a transceiver of the multi-function image-forming device, receiving the unique identification as transmitted by the mobile communication device to the wireless access point;

wherein authenticating the mobile communication device comprises comparing the unique identification received by the transceiver with the unique identifier associated with the multi-function image-forming device.

20. The method of claim 19, wherein the method further comprises, by the multi-function image-forming device generating the machine-readable code comprises randomly generating the machine-readable code so that the secure connection is a secure wireless connection between the multi-function image-forming device and the mobile communication device.

21. The method of claim 18, wherein:
the mobile communication device includes an audio device; and
the method further comprises providing, via the audio device, an authentication confirming receipt of the authentication message.

22. The method of claim 1, wherein presenting the machine-readable code comprises displaying the machine readable code on a display screen of the multi-function image-forming device or printing a copy of the machine-readable code.

* * * * *